J. R. BINNS.
AUTOMATIC TURNING LATHE.
APPLICATION FILED OCT. 16, 1912.
1,062,319.
Patented May 20, 1913.
5 SHEETS—SHEET 1.
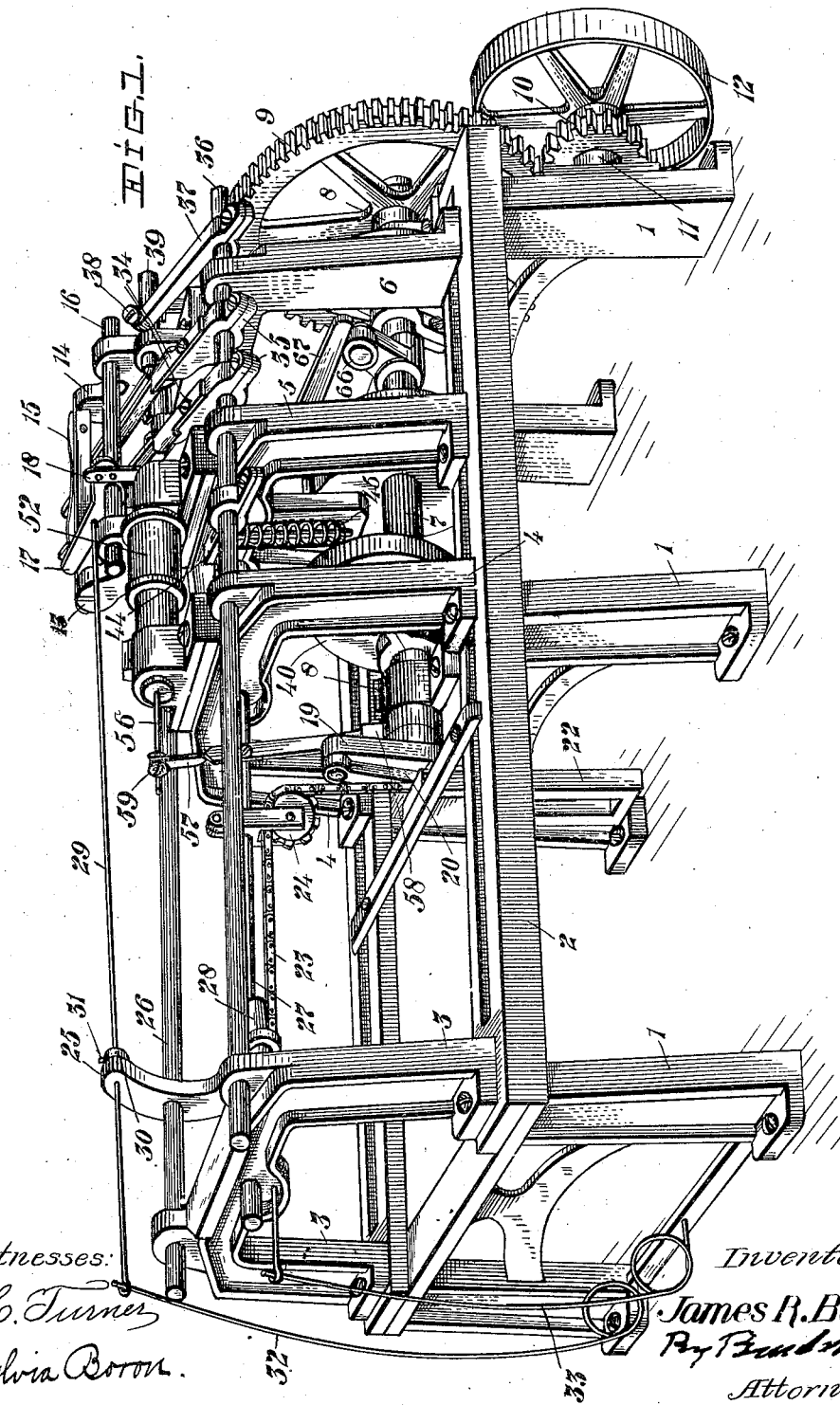

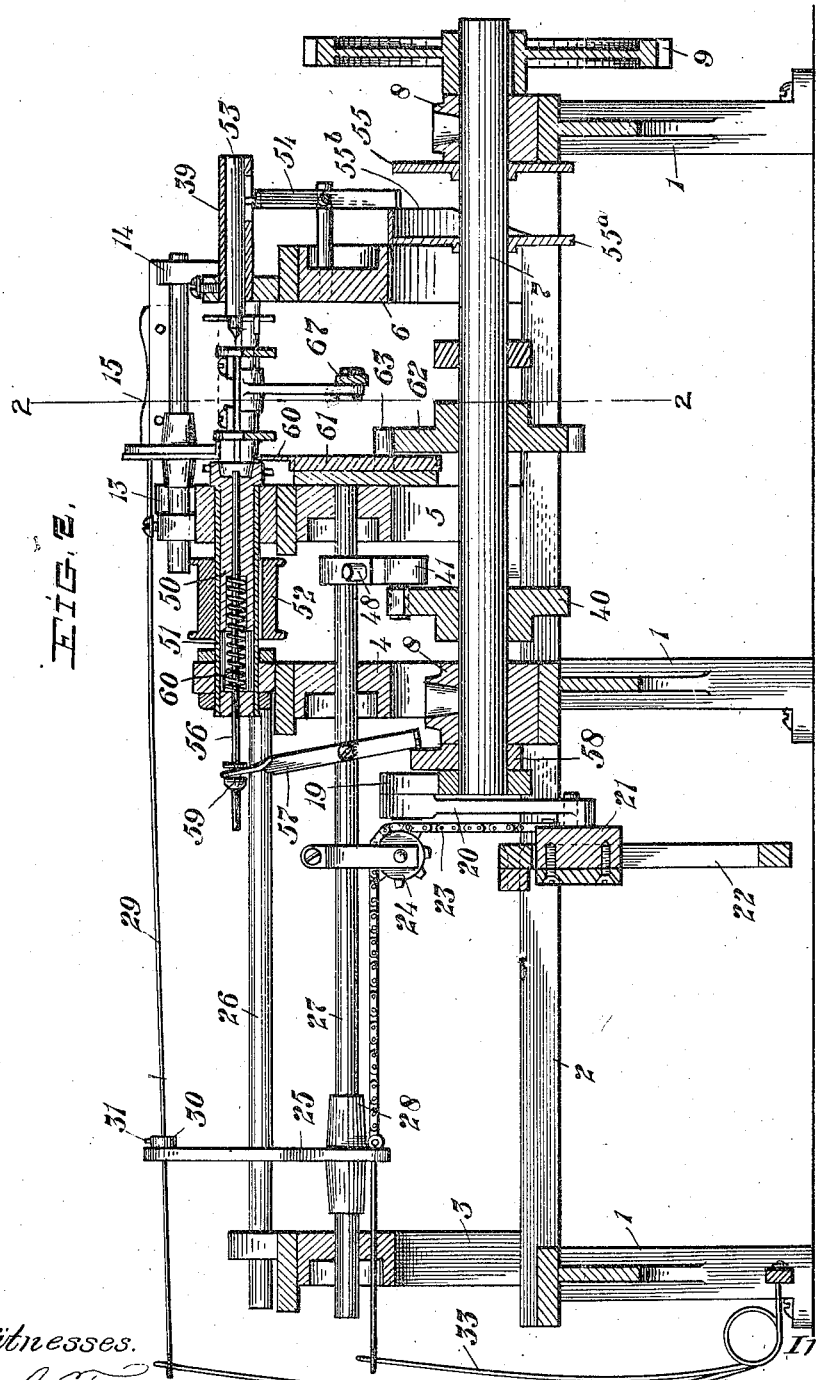

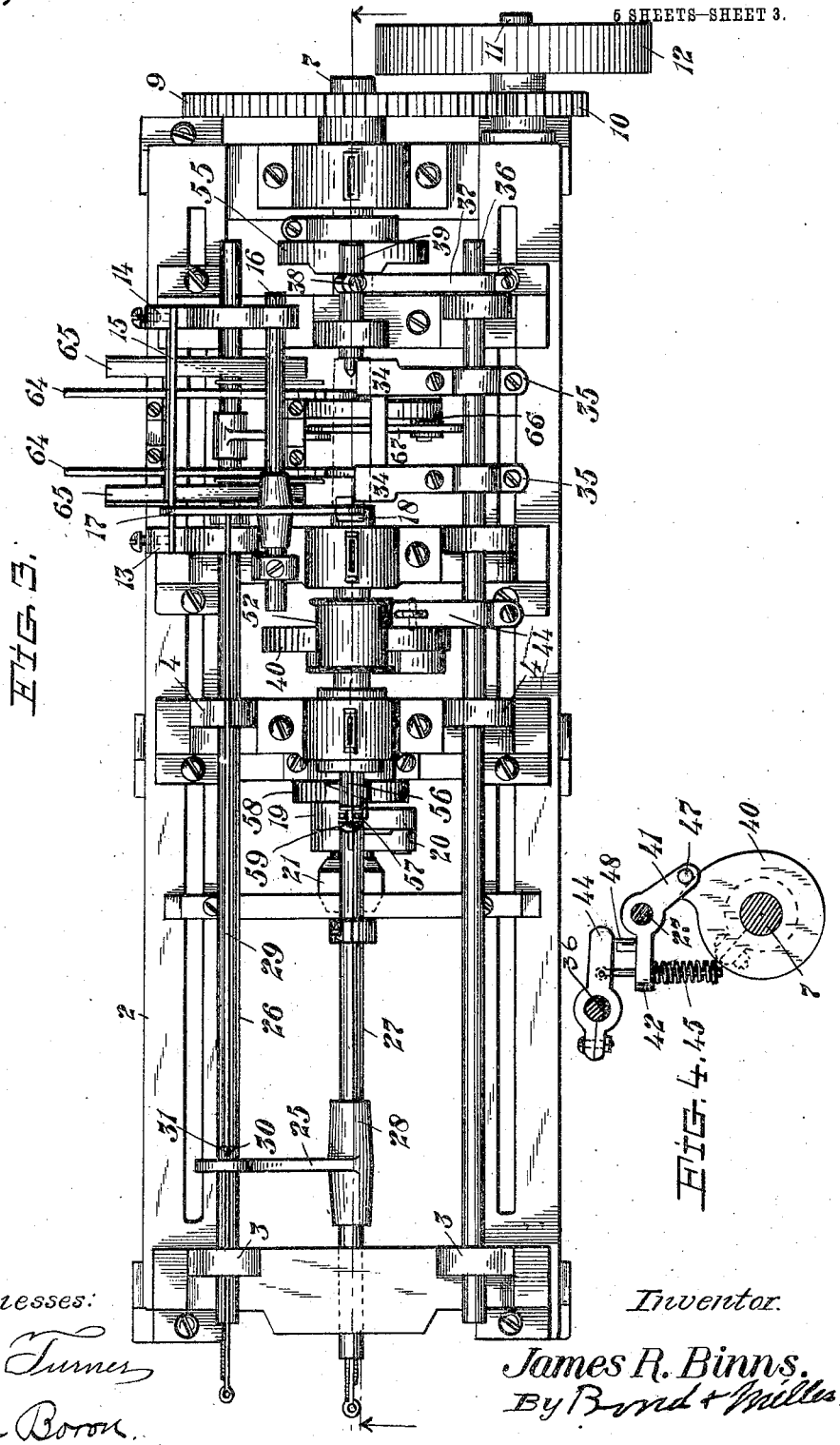

J. R. BINNS.
AUTOMATIC TURNING LATHE.
APPLICATION FILED OCT. 16, 1912.

1,062,319.

Patented May 20, 1913.

5 SHEETS—SHEET 4.

Witnesses:
J. C. Turner
Sylvia Boron

Inventor.
James R. Binns.
By Bond & Miller
Attorneys.

J. R. BINNS.
AUTOMATIC TURNING LATHE.
APPLICATION FILED OCT. 16, 1912.
1,062,319.
Patented May 20, 1913.
5 SHEETS—SHEET 5.
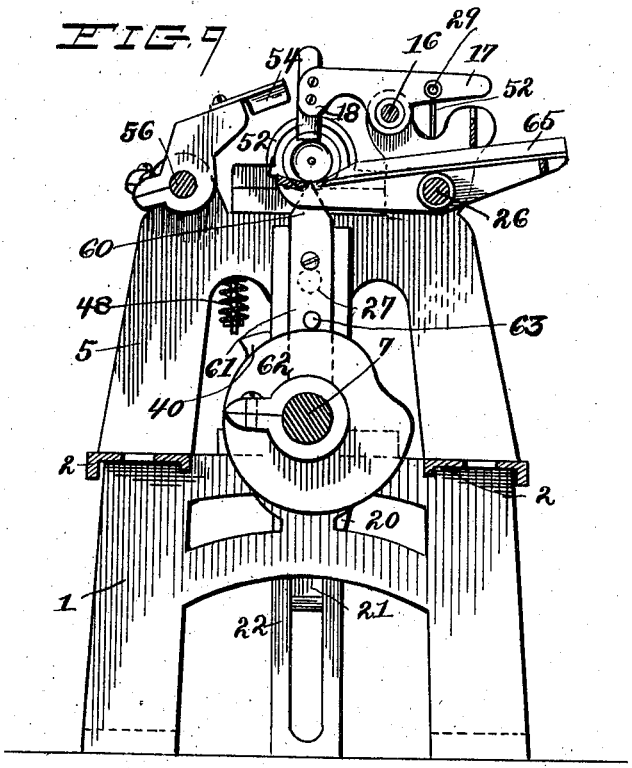
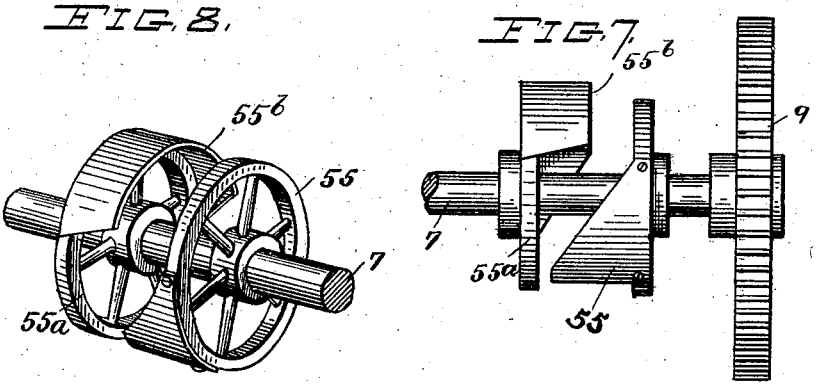
Witnesses:
J. C. Turner
Sylvia Boron.
Inventor:
James R. Binns.
By Bond & Miller
Attorneys.

UNITED STATES PATENT OFFICE.

JAMES R. BINNS, OF CANTON, OHIO, ASSIGNOR OF ONE-HALF TO EDWIN D. MYERS, OF CANTON, OHIO.

AUTOMATIC TURNING-LATHE.

1,062,319. Specification of Letters Patent. Patented May 20, 1913.

Application filed October 16, 1912. Serial No. 726,050.

*To all whom it may concern:*

Be it known that I, JAMES R. BINNS, a citizen of the United States, residing at Canton, in the county of Stark and State of Ohio, have invented certain new and useful Improvements in Automatic Turning-Lathes, of which the following is a specification.

My invention relates to improvements in automatic turning lathes, in which mechanism is provided for automatically feeding the stock designed to be turned and to provide various predetermined forms.

The objects of the present invention, are first, to provide a machine in which the various movable parts are so timed that the stock can be properly fed and second, to provide mechanism for automatically bringing the forming knives and cutting knives into proper action, and third, to generally improve automatic turning lathes so that uniform accuracy is maintained, reference of course, being had to specifically designed handles, but it will be understood that the devices for producing different designs or formations may be varied. These objects together with other objects readily apparent to those skilled in the art, I attain by the construction illustrated in the accompanying drawings, although my invention may be embodied in a variety of other mechanical forms, the construction illustrated being chosen as the most desirable.

Figure 5:
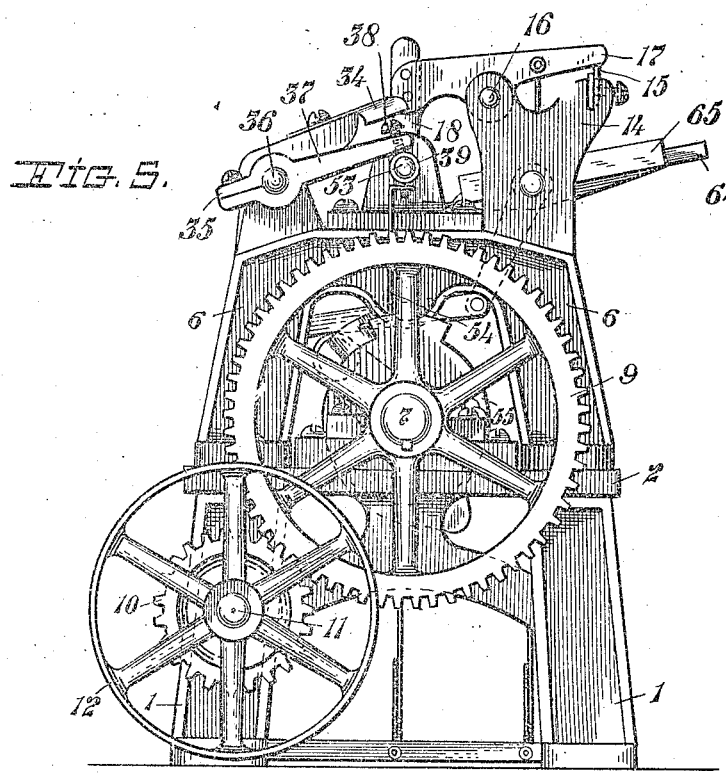
Figure 6:
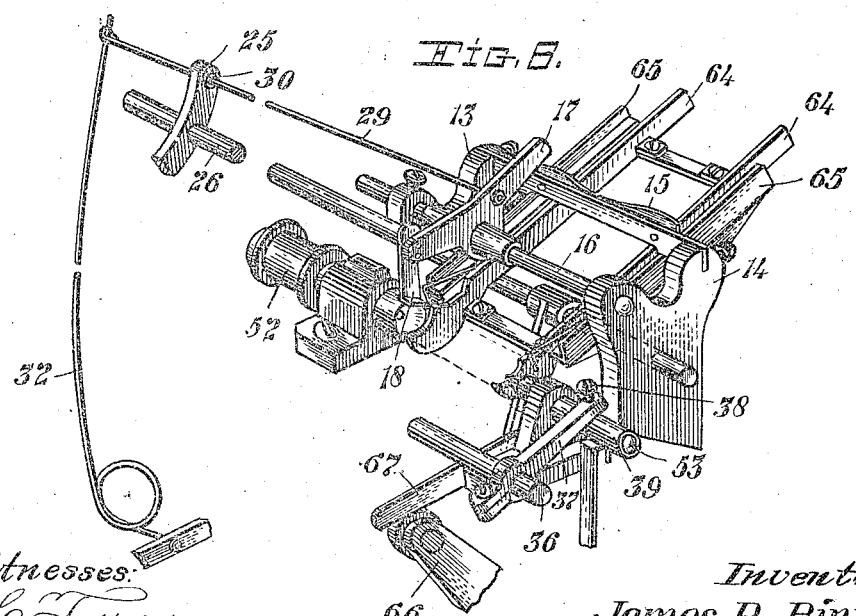

In the accompanying drawings—Figure 1 is a perspective view. Fig. 2 is a longitudinal view showing parts in section. Fig. 3 is a top plan view. Fig. 4 is a transverse section of the power shaft showing the knife actuating cam located thereon, also showing transverse section of the rock shaft. Fig. 5 is an end view showing the power end of the lathe. Fig. 6 is a detached perspective view showing portions of the handle holding devices also showing the gage plate and a forming knife actuating head. Fig. 7 is a side elevation of the tail-bar actuating cams showing a portion of the driving shaft and an edge view of the gear wheel. Fig. 8 is a detached perspective view of the tail-bar actuating cams showing portion of the driving shaft. Fig. 9 is a transverse section taken on line 2—2 of Fig. 2.

Similar numerals of reference indicate corresponding parts in all the figures of the drawings.

In the accompanying drawings, 1 represents the standard or base frames to which are connected or formed integral therewith the base frame 2 to which base 2 are attached the standards 3, 4, 5 and 6, said standards are preferably adjustably attached at their bottom or lower ends to the base frame 2, except the standard 3, which may be if desired, permanently fixed to the base plate 2. The driving shaft 7 is journaled in suitable bearings such as 8 held in fixed relationship with reference to the base frame 2. Upon the driving shaft 7 is mounted the gear wheel 9, which gear wheel is driven by the pinion 10, said pinion being mounted upon the shaft 11 together with the driving wheel 12, which driving wheel is driven from any source of power. The method of imparting rotary movement to the driving shaft 7 is shown conventionally as it will be understood that any kind of gear may be employed without departing from the nature of the present invention.

The standards 5 and 6 are provided with the upright members 13 and 14 which uprights are for the purpose of receiving the pattern 15. The upright members 13 and 14 also carry the bar 16 upon which bar is pivotally mounted the rock arm 17 to which rock arm is connected the forming knife 18. The rock arm 17 is so arranged that it is moved along and upon the pattern 15, thereby imparting a rocking movement to the opposite end of the rock arm 17 so that it will produce a handle in accordance with the pattern 15. It will be understood that different patterns may be employed and must be employed to produce different patterns, and it therefore follows that a variety of shapes can be produced by changing from time to time the patterns 15. For the purpose of causing the knife to travel along and upon the blank the driving shaft 7 is provided at its inner end with the crank 19, to which crank is pivotally connected one end of the link 20. The opposite end of said link being pivotally connected to the sliding block 21, which sliding block is moved up and down in the slotted guide 22, which guide is held in proper fixed relationship with reference to the fixed parts of the lathe. To the sliding block or head 21 is attached in any convenient and well known manner the chain 23 or its equivalent, which chain passes over the wheel 24 and is extended and connected to the head 25 which head moves back and forth upon the guide rods 26 and 27, which guide rods are held in fixed relationship by being securely connected to the proper standards or their equivalents. For the purpose of preventing any tilting or wabbling movement of the head 25, said head is provided with the sleeve 28, which sleeve is extended a short distance in opposite directions from the sides of the head 25.

For the purpose of moving the rock-arm 17 together with the forming knife 18 in one direction and in the direction to form the handle by the cutting action of the knife the rod 29 is provided which rod is securely attached in any convenient and well known manner to the rock-arm 17. This rod 29 extends through a suitable aperture in the head 25 so that said head can move for a portion of its distance if desired without imparting reciprocating or longitudinal movement to the rod 29. However it is of importance and in fact necessary for the head 25 and the rod 29 to move in unison during the time the cutting knife 18 is in action and in order to produce this simultaneous movement of the head 25 and the rod 29 said rod is provided with the adjustable block 30, which adjustable block is securely held in fixed adjustment upon the rod 29 by the set screw 31. It will be understood that by adjusting the block 30 the cutting knife 18 will be brought into action when the head 25 strikes the block 30 but not before.

For the purpose of resetting the knife 18 for a new cut the spring 32 is provided which spring is so tensioned that as the head 25 is moved backward when released from the pulling action of the chain 23, said spring 32 will also move the rod 29 carrying with it the rock arm 17 and the cutting knife 18. The spring 33 will move the head 25 backward when the same is released. The spring 33 should be of sufficient strength to move not only the head 25 but also the chain 23 as said chain is released by the upward movement of the sliding block 21. It is well understood that in the proper formation of various shaped handles it is of importance to properly cut the ends of the handles, giving to said ends the desired formation. In order to provide for thus cutting the ends of the handles suitable end cutting knives 34 are provided, which knives are mounted upon the swinging arms 35, which swinging arms are securely mounted in any convenient and well known manner upon the rock shaft 36, which rock shaft is journaled in the proper supports or fixed portions of the frame proper. It will also be understood that the inward movement of the end cutting knives 34 should be stopped the instant the ends of the handle have been properly cut, and in order for thus stopping the inward movement of the end cutting knives 34, the stop-arm 37 is provided, which stop-arm is securely mounted upon the rock-shaft 36. For the purpose of providing the proper adjustment for the stop-arm 37, the inner end of said stop-arm is provided with the set screw 38, the inner end of which set screw strikes against the tail block head 39.

For the purpose of moving the end cutting knives 34 inward or toward the longitudinal center of the handle acted upon the driving shaft 7 is provided with the cam 40, which cam is for the purpose of actuating the trip lever 41, which trip lever is pivotally mounted upon the guide rod 27 and is provided with the extension 42, through which extension the rod 43 passes which rod is pivoted at its top or upper end to the rock shaft actuating arm 44. Below the extension 42 is located the spring 45, which spring presses against the underside of the extension 42 and its opposite end presses against the head 46 secured to the bottom or lower end of the rod 43. It will be understood that as the cam 40 is rotated in the proper direction the trip lever 41 will be moved so as to swing said trip lever away from the driving shaft 7, thereby moving the extension 42 downward carrying with it the arm 44 and thereby rocking the rock shaft 36 to which rock shaft the end cutting knives 34 are operatively connected. The cam 40 actuates the trip arm 41 by means of the pin 47, which engages the periphery of said cam. It will be understood that when the stop arm 37 is brought to a dead stop the movement of the rock shaft should also be stopped so as to prevent any accidental movement of the end cutting knives and in order to provide for the actual stopping of the rock shaft 36, even before the trip lever 41 has been released the spring 45 will permit a slight movement of the trip lever or arm 41 independent of the movement of the arm 44, so that if in the event the set screw 38 carried by the stop arm 37 should strike the tail block head 39 before the trip arm 41 has been actually released, said cam can continue to move or rotate until the trip arm 41 is released without imparting any movement to the rock shaft 36. When the trip arm 41 has been released by the action of the cam 40, the spring 45 will automatically move the arm 44 in the opposite direction from that moved by the cam 40, which movement elevates the inner ends of the end cutting knives. This upward movement is brought about by the pin 48 striking the bottom or underside of the arm 44.

For the purpose of holding the handle or more specifically the blank from which the handle is to be formed the usual spindle 50 is provided, which spindle is preferably located in the sleeve 51 and upon which sleeve is mounted the driving pulley 52. The tail-bar 53 is slidably mounted in the tail-block or head 39 and is actuated to hold the blank and to release the blank by means of the rock-bar 54 and the cams 55 and 55ª, said cams 55 and 55ª being securely mounted upon the driving shaft 7. The cam 55 is so timed that it will release the block or blank after the proper turning or cutting action has been given to the blank. The cam 55ª is so timed that it will actuate the rock bar 54 in the direction to hold the blank, said cam 55ª being provided with a straight face or edge 55ᵇ, said straight face or edge being of sufficient length to hold the tail bar 53 against the end of the blank for a sufficient time to permit the proper cutting or turning of the handle and after the straight edge has fully passed the rock bar 54, the cam 55 moves the rock bar 54 in the opposite direction and releases the blank. It will be understood that the rock bar 54 should be pivotally connected to the tail-bar 53 at one end and also pivotally connected intermediate its ends, so as to be properly actuated by the cams 55 and 55ª. It will also be understood that in automatic machines of this class it is necessary to remove the socket stub from the spindle after it has been properly cut from the handle and in order to provide for this automatic action the push rod 56 is provided, which push rod is actuated by the rock bar 57 and the cam 58, said cam 58 being mounted upon the driving shaft 7. It will be understood that when the rock bar 57 is moved at its top or upper end toward the socket shaft 50, it will move said push rod by means of the grooved head 59 secured upon said push rod and for the purpose of retracting said push rod after it has performed its function and been released from the cam 58, the spring 60 is provided, which spring is compressed when the push rod 56 is moved by the cam 58 and automatically expanded when the rock bar 57 has been released from its cam action.

For the purpose of properly truing up the socket end of the handle and insuring the proper cutting off of the socket portion the knife 60' is provided, which knife is secured to the sliding head 61, which sliding head is actuated by the cam 62 and the pin 63, the pin 63 being securely connected to the sliding head 61. The cam 62 is mounted upon the driving shaft 7 and rotates with said driving shaft. It will be understood that all of the cams mounted upon the driving shaft 7 should be so timed that the various parts actuated by said cams will also be so timed that there will be no interference with the various parts during their action.

For the purpose of actuating the blank feeding devices which feeding devices are made up of the blank holding bars 64, the guide bars 65 are provided, which bars are held in proper relative position with reference to the socket shaft and tail bar of the lathe proper and are rocked or oscillated by means of the crank or cam 66 and the rock arm 67. The blank feeding device in this application as a device is the same as the one shown and described in my previous application for Letters Patent for improvement in automatic machine for boring handles, filed June 10, 1912, Serial No. 702,644, which application gives a full detailed description, and to describe it here would be a repetition of the description in my former application.

The cam 55 will rock the bar 54 in one direction and for the purpose of rocking the said bar in the opposite direction the cam 55ª is provided by means of the two cams, the rock bar 54 is so timed that the tail-bar 53 will be actuated at the same time both to hold the blank and to release the same.

Having fully described my invention what I claim as new and desire to secure by Letters Patent, is—

1. In an automatic turning lathe of the class described, the combination of a suitable frame, a driving shaft, said driving shaft provided with a series of cams, a crank secured to one end of the driving shaft, a link pivotally connected to said crank, a block pivoted to said link, means for guiding the block, a chain connected to said block at one end, a sliding head and one end of said chain connected to said sliding head, a rod located through said head and provided with an adjustable block, a sliding rock arm provided with a cutting knife and slid by said rod, a pattern plate adapted for contact with said rock arm, a rock shaft provided with rock arms, said rock arms provided with end forming knives, a trip lever adapted to be actuated by one of the cams of the series, an actuating arm secured to the rock arm carrying the end cutting knives, a rod pivotally connected to said rock arm and a spring located around said rod and adapted for engagement with the trip lever, substantially as and for the purpose specified.

2. In an automatic turning lathe, the combination of a frame, a driving shaft, a crank secured at one end of the driving shaft, a link pivotally connected to said crank, a block pivoted to said crank, means for guiding the block, a sliding head, guide rods adapted to guide said sliding head, means intermediate the block and the sliding head, adapted to move the sliding head in one direction, a rod located through said sliding head, said rod provided with an adjustable block, a sliding rock arm secured to said rod to be slid thereby, said rock arm provided with a turning knife, a pattern plate adapted to actuate said rock arm, a socket shaft, means for rotating said socket shaft, a reciprocating tail-bar, means for reciprocating said tail-bar, a spring adapted to move the sliding head in one direction, a rock shaft provided with rock arms, said rock arms provided with end forming knives, a stop arm adapted to limit the movement of the rock arms, a cam adapted to actuate the rock shaft and yielding means between said rock arm and cam, substantially as and for the purpose specified.

3. In an automatic turning lathe the combination of a frame, a driving shaft, a series of cams mounted upon said driving shaft, a series of standards supported upon said frame and spaced from each other, guide rods carried by said standards, a head slidably mounted upon said guide rods, means for imparting sliding movement to said head, a rod located through said head, said rod provided with an adjustable block adapted for contact with said sliding head, a sliding rock arm secured to said rod to be slid thereby, said rock arm provided with a turning knife, a pattern plate adapted to actuate said rock arm, a rotatable socket shaft and a reciprocating tail bar, a rock shaft adapted to be rocked by one of the cams of the series upon the drive shaft, rock arms secured to said rock shaft, said rock arms provided with cutting knives and means for limiting the rocking movement of the rock arms and cutting knives, substantially as and for the purpose specified.

4. In an automatic turning lathe the combination of a frame, a driving shaft, a series of cams mounted upon said driving shaft, a series of standards supported upon said frame and spaced from each other, guide rods carried by said standards, a head slidably mounted upon said guide rods, means for imparting sliding movement to said head, a rod located through said head, said rod provided with an adjustable block adapted for contact with said sliding rod, a sliding rock arm secured to said rod to be slid thereby, said rock arm provided with a turning knife, a pattern plate adapted to actuate said rock arm, a rotatable socket shaft and a reciprocating tail bar, a rock shaft adapted to be rocked by one of the cams of the series upon the drive shaft, rock arms secured to said rock shaft, said rock arms provided with cutting knives and means for limiting the rocking movement of the rock arms and cutting knives, and an end cutting knife located adjacent the socket shaft and means for actuating said end cutting knife, substantially as and for the purpose specified.

In testimony that I claim the above, I have hereunto subscribed my name in the presence of two witnesses.

JAMES R. BINNS.

Witnesses:
  JOHN H. BISHOP,
  HAZEL OWEN.